(12) United States Patent
Rubie

(10) Patent No.: US 11,559,815 B2
(45) Date of Patent: Jan. 24, 2023

(54) SUSPENSION AND GUIDANCE APPARATUS FOR TOOLS AND PLATFORMS RELATIVE TO A MILL

(71) Applicant: RUSSELL MINERAL EQUIPMENT PTY LTD, Toomwoomba (AU)

(72) Inventor: Peter John Rubie, Toowoomba (AU)

(73) Assignee: Russell Mineral Equipment Pty Ltd., Toowoomba (AU)

(*) Notice: Subject to any disclaimer, the term of this patent is extended or adjusted under 35 U.S.C. 154(b) by 69 days.

(21) Appl. No.: 17/345,353

(22) Filed: Jun. 11, 2021

(65) Prior Publication Data

US 2021/0299673 A1    Sep. 30, 2021

Related U.S. Application Data

(63) Continuation of application No. 15/571,972, filed as application No. PCT/AU2016/050333 on May 6, 2016, now abandoned.

(30) Foreign Application Priority Data

May 6, 2015    (AU) ................................ 2015901622

(51) Int. Cl.
*B02C 17/02*    (2006.01)
*B02C 17/18*    (2006.01)
(Continued)

(52) U.S. Cl.
CPC .............. *B02C 17/18* (2013.01); *B02C 23/00* (2013.01); *B25J 11/008* (2013.01)

(58) Field of Classification Search
CPC .... B25J 5/02; B25J 5/06; B25J 11/008; B02C 17/18; B02C 23/00
See application file for complete search history.

(56) References Cited

U.S. PATENT DOCUMENTS 2,948,168 A    8/1960    McCormick
3,559,529 A    2/1971    Vertin
(Continued)

FOREIGN PATENT DOCUMENTS

CN    200954987 Y    10/2007
CN    202207619 U    5/2012
(Continued)

OTHER PUBLICATIONS

International Search Report and Written Opinion dated Jul. 1, 2016 for PCT Application No. PCT/AU2016/050333.
(Continued)

*Primary Examiner* — Randell J Krug
(74) *Attorney, Agent, or Firm* — McCarter & English, LLP

(57) ABSTRACT

The present invention provides an apparatus for suspending and guiding at least one tool or work platform externally about a grinding mill, the apparatus including (a) a fixed track suspended above the grinding mill and extending about an outer periphery thereof in a plane substantially parallel to a surrounding floor of the mill, and, (b) at least one carriage assembly mounted to the track for suspending and guiding the at least one tool or work platform, the at least one carriage assembly configured to provide the at least one tool or work platform with at least two degrees of freedom, and wherein a first degree of freedom is linear movement along a first axis orthogonal to the surrounding floor of the mill.

20 Claims, 9 Drawing Sheets

(51) Int. Cl.
*B02C 23/00* (2006.01)
*B25J 11/00* (2006.01)

(56) References Cited

U.S. PATENT DOCUMENTS

| | | | |
|---|---|---|---|
| 3,802,150 | A | 4/1974 | Melton et al. |
| 4,018,393 | A | 4/1977 | Larsen |
| 4,773,815 | A | 9/1988 | Lemelson |
| 4,781,517 | A | 11/1988 | Pearce et al. |
| 5,375,313 | A | 12/1994 | Apodaca et al. |
| 5,475,604 | A | 12/1995 | Nagamatsu |
| 5,752,665 | A | 5/1998 | Wason |
| 6,871,596 | B2 | 3/2005 | De-Gol |
| 6,904,980 | B2 | 6/2005 | Rubie |
| 8,152,086 | B2 | 4/2012 | Möller et al. |
| 8,196,676 | B2 | 6/2012 | Rubie |
| 8,359,944 | B2 | 1/2013 | Li et al. |
| 9,616,429 | B2 | 4/2017 | Möller et al. |
| 2003/0056352 | A1 | 3/2003 | McLellan et al. |
| 2003/0172834 | A1* | 9/2003 | De-Gol .................. A63G 21/08 104/53 |
| 2006/0182557 | A1 | 8/2006 | Frauen et al. |
| 2007/0006658 | A1 | 1/2007 | Kennedy et al. |
| 2007/0180678 | A1* | 8/2007 | Salamanca ............. B02C 17/00 29/426.4 |
| 2009/0126177 | A1 | 5/2009 | Coray |
| 2009/0143207 | A1 | 6/2009 | Wampler et al. |
| 2010/0057254 | A1 | 3/2010 | Salamanca |
| 2012/0102703 | A1 | 5/2012 | Salamanca |
| 2012/0181364 | A1 | 7/2012 | Mepham et al. |
| 2013/0140387 | A1 | 6/2013 | Fernandez |
| 2013/0261876 | A1 | 10/2013 | Froom et al. |
| 2015/0032387 | A1 | 1/2015 | Froom et al. |
| 2015/0033529 | A1 | 2/2015 | Allen |

FOREIGN PATENT DOCUMENTS

| | | |
|---|---|---|
| CN | 204747937 U | 11/2015 |
| WO | WO 1997/026116 | 7/1997 |
| WO | WO 2001/028688 A1 | 4/2001 |
| WO | WO 2012/079123 A2 | 6/2012 |
| WO | WO 2013/090984 A1 | 6/2013 |
| WO | WO 2014/124491 | 8/2014 |
| WO | WO 2016/030579 A1 | 3/2016 |
| WO | WO 2016/176739 | 11/2016 |

OTHER PUBLICATIONS

International Preliminary Report on Patentability dated Sep. 3, 2019 for PCT Application No. PCT/AU2018/050169.
U.S. Appl. No. 15/571,972, filed Jan. 8, 2018, US 2018/0141052 A1.
PCT/AU2016/050333, filed May 6, 2016, WO 2016/176739.

* cited by examiner

SUSPENSION AND GUIDANCE APPARATUS FOR TOOLS AND PLATFORMS RELATIVE TO A MILL

CROSS-REFERENCE TO RELATED APPLICATIONS

The present application is a continuation application that claims priority benefit to a non-provisional application entitled "SUSPENSION AND GUIDANCE APPARATUS FOR TOOLS AND PLATFORMS RELATIVE TO A MILL," which was filed on Jan. 8, 2018 and assigned Ser. No. 15/571,972, and which was a Rule 371 national filing based on PCT/AU2016/05033 entitled "SUSPENSION AND GUIDANCE APPARATUS FOR TOOLS AND PLATFORMS RELATIVE TO A MILL," which was filed on May 6, 2016 and which claimed priority from Australian Provisional Patent Application No. 2015901622 entitled "SUSPENSION AND GUIDANCE APPARATUS FOR TOOLS AND PLATFORMS RELATIVE TO A MILL," which was filed on May 6, 2015, the contents of which are hereby incorporated by reference in their entirety.

BACKGROUND OF THE INVENTION

The present invention relates to an apparatus for suspension and guidance of tools and platforms relative to a mill, and in one example to the suspension and guidance of linerbolt removal tools and work platforms about the exterior of a grinding mill.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Sacrificial liners are secured to the internal casing of ore grinding mills. They are typically provided as segments, and they are secured internally of the mill shell by bolts which are fitted from the internal side of the shell and project through apertures in the liners and through mounting bores in the shell. A nut and sealing washer are threaded onto and tightened onto each bolt from outside the shell, drawing the liner to the inner surface of the shell. An example of a conventional liner segment fastener system is shown in U.S. Pat. No. 4,018,393. Typically the bolts used for such application are referred to as linerbolts.

Ore mills are generally run continuously for economic efficiency. The continuous process wears down the liners over a period of time, which will depend on the type of ore and application, after which the liners will have to be replaced. Because down time of the ore mill adversely affects the economic efficiency of the process, it is essential to change liners as quickly as possible.

In such applications, the bolts on liners become corroded and clearances between bolts and holes become compacted with ore fines. This results in difficult bolt removal. As a result the many bolts that are utilised to attach the liners to the mill shell are often required to be freed manually by the use of large sledge-hammers, and more frequently by percussive devices such as jack-hammers and hydraulically powered hammers to provide repetitive impacts.

Liner replacement involves removal of nuts, typically followed by hammering the exposed bolt from the outside the mill. In known hammering devices capable of delivering the necessary impacts, a high reaction force is produced which necessitates that such devices be carried by articulating machines or be rigidly attached to some support structure. Various types of hydraulic and pneumatic hammering devices, commonly referred as linerbolt removal tools, are shown in International publication WO1997/026116, U.S. Pat. Nos. 6,904,980 and 8,196,676.

Typically linerbolt removal tools are suspended from monorails or telescoping jibs, which requires manual manipulation and leads to error in tool alignment. Whilst efficiency has improved over the years with use of linerbolt removal tools, it is desirable to further improve the replacement of liners.

US 2007/0180678 and US 2012/0102703 propose a robotized method of removing bolts from SAG and/or ball mills. A five-axis anthropomorphic robot mounted on rails is used to address handling and alignment issues. However, such an anthropomorphic robot is an expensive option particularly when two or more robots are disposed around the mill and is likely to require a complicated control system.

Another method proposed in WO2014/124491 involves the manipulation of tools about the exterior of a mill along a beam which is broadly concentric to the cylindrical section of the mill shell. However this apparatus only functions to its highest potential on the cylindrical section of the mill shell. Furthermore such a system does not aid workers faced with inevitable manual tasks.

It is against this background, and the problems and difficulties associated therewith, that the present invention has been developed.

SUMMARY OF THE PRESENT INVENTION

In one broad form the present invention seeks to provide an apparatus for suspending and guiding at least one tool externally about a grinding mill, the apparatus including:
  a) a fixed track suspended above the grinding mill and extending about an outer periphery thereof in a plane substantially parallel to a surrounding floor of the mill; and,
  b) at least one first carriage assembly mounted to the track for suspending and guiding the at least one tool, the at least one carriage assembly configured to provide the at least one tool with at least two degrees of freedom, and wherein a first degree of freedom is linear movement along a first axis orthogonal to the surrounding floor of the mill.

Typically, a second degree of freedom is linear movement along the track.

Typically, five degrees of freedom are provided, further including:
  a) a third degree of freedom being angular movement about the first axis;
  b) a fourth degree of freedom being angular movement about a second axis orthogonal to the first axis; and,
  c) a fifth degree of freedom being linear movement about a third axis orthogonal to both the first and second axes.

Typically, the apparatus is further configured to suspend and guide at least one platform and to provide the at least one platform with at least two degrees of freedom, and wherein a first degree of freedom provided to the at least one platform is linear movement along an axis orthogonal to the surrounding floor of the mill.

Typically, the second degree of freedom provided to the at least one platform is linear movement along the track.

Typically, four degrees of freedom are provided to the at least one platform, further including:
a) a third degree of freedom being angular movement about the axis orthogonal to the surrounding floor of the mill; and,
b) a fourth degree of freedom being linear movement parallel to the surrounding floor of the mill.

Typically, the carriage assembly is a first carriage assembly that includes:
a) a first carriage moveably mounted to the track for linear movement therealong;
b) a first post member supported by the first carriage and arranged to be orthogonal to the surrounding floor of the mill, at least a part of the post member moveable along the first axis orthogonal to the surrounding floor of the mill; and,
c) a first tool carriage for carrying the at least one tool, the tool carriage mounted to the post member such that the tool carriage is provided with angular movement about the first axis and angular movement about a second axis orthogonal to the first axis, the tool carriage further including a linear slide mechanism allowing the at least one tool to be slidably received thereby allowing the at least one tool to move along a third axis orthogonal to both the first and second axes.

Typically, the apparatus includes a second carriage assembly for supporting the at least one platform, the second carriage assembly including:
a) a second carriage moveably mounted to the track for linear movement therealong;
b) a second post member supported by the secondary carriage and arranged to be orthogonal to the surrounding floor of the mill, at least a part of the post member moveable along an axis orthogonal to the surrounding floor of the mill; and,
wherein, the at least one platform is mounted to a distal end of the second post member to allow angular movement about the axis orthogonal to the surrounding floor of the mill and linear movement orthogonal to the second post member.

Typically, the at least one platform is supported by the first carriage assembly.

Typically, the first carriage assembly is moveably mounted to a first track and the second carriage assembly is moveably mounted to a second track, the second track parallel to the first track.

Typically, the at least one tool is a linerbolt removal tool.

Typically, the at least one platform is a work platform.

According to another broad form the present invention seeks to provide an apparatus for suspending and guiding at least one linerbolt removal tool and at least one work platform externally about a grinding mill, the apparatus including:
a) a fixed track suspended above the grinding mill and extending about an outer periphery thereof in a plane substantially parallel to a surrounding floor of the mill;
b) a first carriage assembly coupled to the track for supporting the at least one linerbolt removal tool, the first carriage assembly configured to provide the at least one linerbolt removal tool with at least two degrees of freedom, and wherein a first degree of freedom is linear movement along an axis orthogonal to the surrounding floor of the mill; and,
c) a second carriage assembly coupled to the track for supporting the at least one work platform, the second carriage assembly configured to provide the at least one work platform with at least two degrees of freedom, and wherein a first degree of freedom is linear movement along an axis orthogonal to the surrounding floor of the mill.

Typically, the at least one linerbolt removal tool is provided with five degrees of freedom and the at least one work platform is provided with four degrees of freedom.

Typically, a third carriage assembly is provided for supporting a second linerbolt removal tool externally about the grinding mill.

Typically, a fourth carriage assembly is provided for supporting a third linerbolt removal tool externally about the grinding mill.

Typically, a fifth carriage assembly is provided for supporting a fourth linerbolt removal tool externally about the grinding mill.

Typically, a sixth carriage assembly is provided for supporting a second work platform externally about the grinding mill.

According to another broad form the present invention seeks to provide an apparatus for suspending and guiding at least one tool externally about a grinding mill via a fixed track, said apparatus provides five degrees of freedom to said at least one tool, wherein at least one of said degrees of freedom is linear movement along a first axis orthogonal to the surrounding floor of said mill.

Typically, a second of said five degrees of freedom is angular movement about said first axis orthogonal to the surrounding floor of said mill.

Typically, a third of said five degrees of freedom is angular movement about a second axis orthogonal to said first axis, and a fourth of said five degrees of freedom is linear movement along an axis orthogonal to said second axis of rotation.

Typically, a fifth degree of freedom is movement along a fixed track parallel to and located above said mill and said mill floor.

Typically, the apparatus also provides four or less degrees of freedom to said at least one platform, wherein at least one of said degrees of freedom is linear movement along a first axis orthogonal to the surrounding floor of said mill.

Typically, a second of said four degrees of freedom is angular movement about said first axis orthogonal to the surrounding floor of said mill.

Typically, a third of said four degrees of freedom is linear movement along an axis parallel to the surrounding floor of said mill.

Typically, a fourth degree of freedom is movement along a fixed track parallel to and located above said mill and said mill floor.

Typically, at least one tool is a first tool and said apparatus comprises a fixed track parallel to the outline of said mill in plan view, such that said fixed track is disposed outside and surrounding said mill, a primary carriage is mounted for travel along said fixed track, and a substantially straight first rail orthogonal to said surrounding floor of said mill is mounted to said primary carriage, and at least one tool carriage is mounted for first angular movement about said first axis orthogonal to said floor and second angular movement about a second axis orthogonal to said first axis, said first tool mounted to said tool carriage via a linear slide mechanism allowing said first tool to move along an axis orthogonal to said second axis.

Typically, at least one platform is mounted to a secondary carriage mounted for travel along said fixed track, and a substantially straight second rail orthogonal to said surrounding floor of said mill is mounted to said secondary carriage, and at least one platform is mounted for angular movement about said first axis of said second rail and linear movement orthogonal to said first axis of said second rail.

Typically, said fixed track is a structure suspended above said mill.

Typically, said first tool is a linerbolt removal tool.

Typically, said platform is a work platform.

According to another broad form the present invention seeks to provide an apparatus for suspending and guiding at least a linerbolt removal tool and at least a work platform externally of a grinding mill, said linerbolt removal tool associated with a first carriage assembly and used for knocking out linerbolts and liners on a cylindrical main body portion of said mill and knocking out linerbolts on a frusto-conical end portion of said mill connected to said cylindrical main body portion, said first carriage assembly providing no more than five degrees of freedom to its linerbolt removal tool and wherein at least one of said degrees of freedom is linear movement along an axis orthogonal to the surrounding floor of said mill. Said work platform with a second carriage assembly and used for manual tasks on a cylindrical main body portion of said mill and manual tasks on a frusto-conical end portion of said mill connected to said cylindrical main body portion, said second carriage assembly providing no more than four degrees of freedom to its first work platform and wherein at least one of said degrees of freedom is linear movement along an axis orthogonal to the surrounding floor of said mill.

Typically, a second linerbolt removal tool associated with a third carriage and similar to that of the primary carriage assembly, said second linerbolt removal tool and its associated carriage assembly used for knocking out linerbolts on a cylindrical main body portion of said mill and knocking out linerbolts on a frusto-conical end portion of said mill connected to said cylindrical main body portion.

Typically, a third linerbolt removal tool associated with a fourth carriage and similar to that of the primary carriage assembly, said third linerbolt removal tool and its associated carriage assembly used for knocking out linerbolts on a cylindrical main body portion of said mill and knocking out linerbolts on a frusto-conical end portion of said mill connected to said cylindrical main body portion.

Typically, a fourth linerbolt removal tool associated with a fifth carriage and similar to that of the primary carriage assembly, said fourth linerbolt removal tool and its associated carriage assembly used for knocking out linerbolts on a cylindrical main body portion of said mill and knocking out linerbolts on a frusto-conical end portion of said mill connected to said cylindrical main body portion.

Typically, a second work platform associated with a sixth carriage and similar to that of the secondary carriage assembly, said second work platform and its associated carriage assembly used for manual tasks on a cylindrical main body portion of said mill and manual tasks on a frusto-conical end portion of said mill connected to said cylindrical main body portion.

It will be appreciated that the broad forms of the invention and their respective features can be used in conjunction, interchangeably and/or independently, and reference to separate broad forms in not intended to be limiting.

BRIEF DESCRIPTION OF THE DRAWINGS

An non-limiting example of the present invention will now be described with reference to the accompanying drawings, in which: —

DETAILED DESCRIPTION OF THE PREFERRED EMBODIMENTS

Figure 1A:
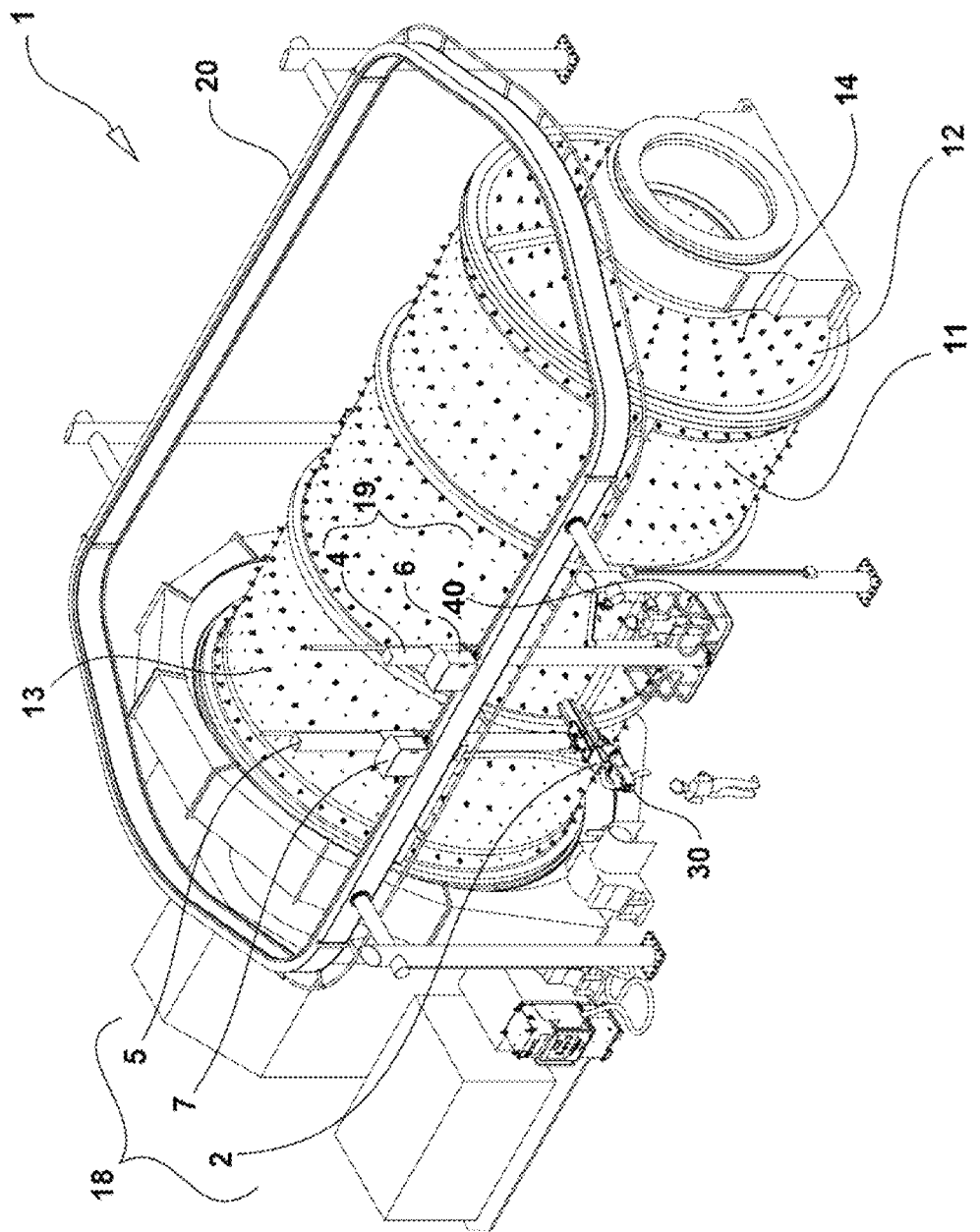
FIG. 1A is a perspective view of an example of an apparatus for suspending and guiding at least one tool or work platform externally about a grinding mill.
Figure 1B:
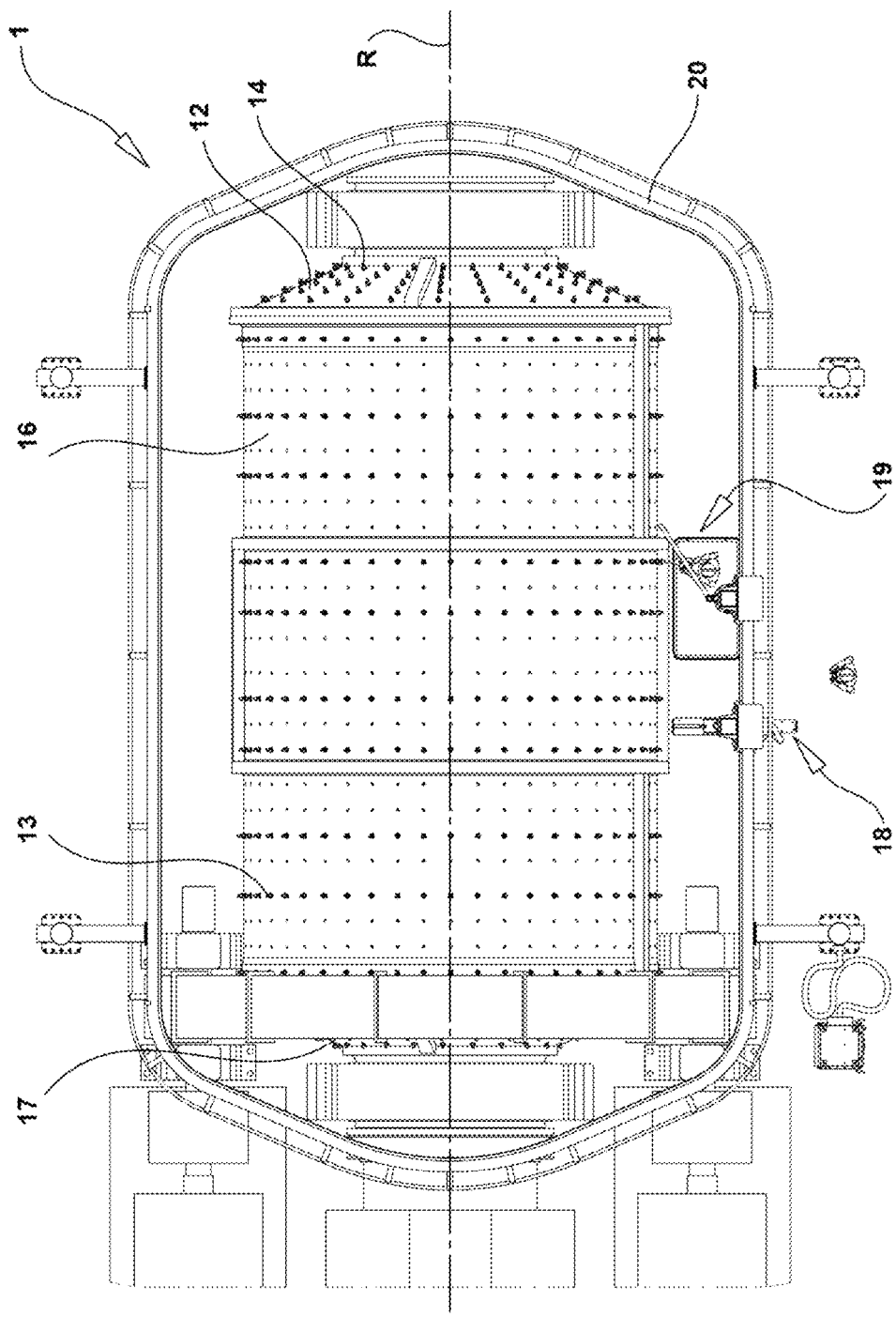
FIG. 1B is a plan view of the apparatus of FIG. 1A.
Figure 1C:
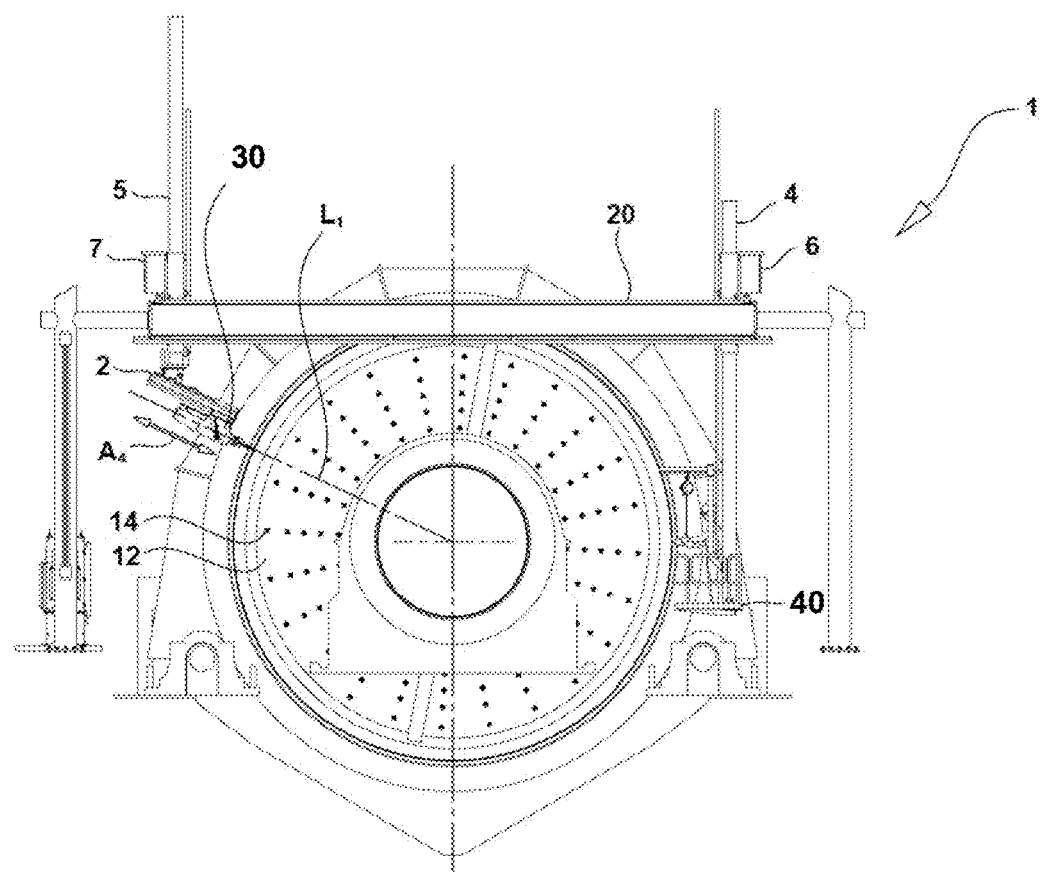
FIG. 1C is an end view of the apparatus of FIG. 1A.

An example of an apparatus 1 for suspending and guiding at least one tool 30 externally about a grinding mill 11 will now be described with reference to FIGS. 1A to 1C.

In this example, a fixed track 20 is suspended above the grinding mill 11 so as to extend about an outer periphery thereof in a plane substantially parallel to a surrounding floor of the mill 11.

At least one first carriage assembly 18 is mounted to the track for suspending and guiding the at least one tool 30, the at least one first carriage assembly 18 configured to provide the at least one tool 30 with at least two degrees of freedom including a first degree of freedom that is linear movement along a first axis orthogonal to the surrounding floor of the mill.

The above described arrangement provides a number of advantages.

Firstly, the at least one tool is able to access a large area of the mill casing so that required maintenance actions (for example linerbolt removal during liner replacement) can be performed more efficiently requiring less mill rotations and time out of service. This may provide the mill operator with a significant cost saving.

The apparatus further provides safety benefits to mill workers involved in routine mill maintenance. In the past, tools were suspended from hanging cables that were free to move about which presents a safety risk to workers who may be struck with the tools. In the above described arrangement, the tool is suspended and guided by a carriage assembly mounted to a track which provides a stable and secure means of supporting the tool.

Furthermore, as the carriage assemblies may be easily removed from the track, a high degree of modularity is provided. At a mine site with several mills potentially of different sizes, the carriage assemblies are able to be interchanged between different mills as required for servicing. This provides a substantial cost reduction as each mill does not require separate apparatus and tools for liner replacement for example.

A number of further features will now be described.

Typically, the first carriage assembly is moveably mounted to the track so that it is permitted to move (e.g. slide) along the track. This provides the at least one tool with a second degree of freedom being linear movement along the track. In one example, the movement is parallel to a direction of elongation of a cylindrical main body portion of the mill.

In a further example, the first carriage assembly may provide five degrees of freedom to the at least one tool. A third degree of freedom provided may be angular movement or rotation about the first axis. A fourth degree of freedom provided may be angular movement or rotation about a second axis orthogonal to the first axis. A fifth degree of freedom may be linear movement about a third axis orthogonal to both the first and second axes (i.e. toward the mill). By providing the at least one tool with such dexterity of movement, the position and orientation of the tool can be precisely controlled allowing the tool to be used in the removal of linerbolts in both the cylindrical main body portion and frusto-conical end portions of the mill, including linerbolts that may be at an oblique or skewed angle relative to the other linerbolts.

In one example, the apparatus is further configured to suspend and guide at least one platform and to provide the at least one platform with at least two degrees of freedom, and wherein a first degree of freedom provided to the at least one platform is linear movement along an axis orthogonal to the surrounding floor of the mill. The at least one platform can be utilised by workers to perform manual tasks and may be equipped with manual tools such as nut removal tools and the like to assist in removing the linerbolts. The at least one platform may also enable workers to manipulate the tool guided by the first carriage assembly, such as a linerbolt removal tool.

Typically, the second degree of freedom provided to the at least one platform is linear movement along the track. The at least one platform is therefore able to move up and down and laterally about the mill to the position desired by the worker.

In a further example, four degrees of freedom are provided to the at least one platform, further including a third degree of freedom being angular movement about the axis orthogonal to the surrounding floor of the mill, and a fourth degree of freedom being linear movement parallel to the surrounding floor of the mill (i.e. towards and away from the mill). These further degrees of freedom enable the platform to be positioned and oriented for example to manipulate a linerbolt removal tool mounted to the first carriage assembly that may be required to remove linerbolts from one of the frusto-conical ends of the mill or linerbolts at an oblique or skewed angle relative to the other linerbolts.

In one example, the first carriage assembly includes a first carriage moveably mounted to the track for linear movement therealong. A first post member is supported by the first carriage and arranged to be orthogonal to the surrounding floor of the mill, at least a part of the post member moveable along the first axis orthogonal to the surrounding floor of the mill. The post member may be arranged with respect to the first carriage to slide relative thereto or alternatively at least a portion of the first post member may be telescopically arranged to extend and retract.

A first tool carriage for carrying the at least one tool is mounted to the post member such that the tool carriage is provided with angular movement about the first axis and angular movement about a second axis orthogonal to the first axis. The tool carriage further includes a linear slide mechanism allowing the at least one tool to be slidably received thereby allowing the at least one tool to move along a third axis orthogonal to both the first and second axes. The angular movement of the tool carriage with respect to the post may be achieved via any suitable coupling arrangement.

In a further example, the apparatus includes a second carriage assembly for supporting the at least one platform, the second carriage assembly including a second carriage moveably mounted to the track for linear movement therealong. A second post member is supported by the secondary carriage and arranged to be orthogonal to the surrounding floor of the mill, at least a part of the second post member moveable along an axis orthogonal to the surrounding floor of the mill. The at least one platform is rotatably coupled to a distal end of the second post member to allow angular movement about the axis orthogonal to the surrounding floor of the mill. The coupling may further permit linear movement orthogonal to the second post member.

In the above described examples, the at least one work platform is suspended and guided by a different carriage assembly to the at least one tool. However this need not be the case, and in other arrangements, the at least one platform and at least one tool are both suspended and guided by the first carriage assembly.

Furthermore, whilst typically, there is only one fixed track or monorail suspended above the mill, in other examples, more than one track may be provided. In one example, a second track runs parallel to the first track and the first carriage assembly is moveably mounted to the first track whilst the second carriage assembly is moveably mounted to the second track.

Typically, the at least one tool is a linerbolt removal tool used for knocking out linerbolts and liners on a cylindrical main body portion of the mill and knocking out linerbolts on a frusto-conical end portion of the mill connected to said cylindrical main body portion. Other tools however may be used including for example high torque/impact nut removal tools and cleaning tools such as an electric drill with wire brush used in preparing the hole and/or cleaning the shell of the mill once the Linerbolt has been removed. The various tools may be interchangeably mounted to the first carriage assembly or alternatively mounted in addition to the linerbolt removal tool.

As previously described, typically the at least one platform is a work platform for carrying one or more workers and positioning them about the mill to carry out manual tasks as required.

In one example, there is provided an apparatus for suspending and guiding at least one linerbolt removal tool and at least one work platform externally about a grinding mill. The apparatus includes a fixed track suspended above the grinding mill and extending about an outer periphery thereof in a plane substantially parallel to a surrounding floor of the mill A first carriage assembly is coupled to the track for supporting the at least one linerbolt removal tool, the first carriage assembly configured to provide the at least one linerbolt removal tool with at least two degrees of freedom, and wherein a first degree of freedom is linear movement along an axis orthogonal to the surrounding floor of the mill. A second carriage assembly is also coupled to the track for supporting the at least one work platform, the second carriage assembly configured to provide the at least one work platform with at least two degrees of freedom, and wherein a first degree of freedom is linear movement along an axis orthogonal to the surrounding floor of the mill. In this arrangement both the platform carrying at least one worker and the linerbolt removal tool can be positioned and oriented as desired in order to remove linerbolts in both the cylindrical main body portion of the mill and frusto-conical end sections of the mill.

In one example, in order to provide maximum dexterity to both the linerbolt removal tool and work platform, the at least one linerbolt removal tool is provided with five degrees of freedom and the at least one work platform is provided with four degrees of freedom as previously described.

Any suitable number of carriage assemblies may be used by the apparatus for carrying a desired number of linerbolt removal tools and/or work platforms. For example, a third carriage assembly can be provided for supporting a second linerbolt removal tool externally about the grinding mill. A fourth carriage assembly may be provided for supporting a third linerbolt removal tool externally about the grinding mill. A fifth carriage assembly may be provided for supporting a fourth linerbolt removal tool externally about the grinding mill, and a sixth carriage assembly may be provided for supporting a second work platform externally about the grinding mill.

Referring again to FIGS. 1A to 1C, the apparatus 1 for suspending and guiding at least one tool or work platform externally about a grinding mill 11 shall be described in further detail.

In this example, grinding mill 11 is a SAG, AG or ball ore mill of a conventional type which has sacrificial liners (not shown) secured to the internal casing (not shown). Mill 11 has a cylindrical main portion 16 disposed between two frusto-conical end portions 12,17. Linerbolts 13,14 are used to secure the sacrificial liners to mill 11, respectively through the cylindrical main portion 16 and frusto-conical end portions 12,17.

The apparatus 1 includes a first carriage assembly 18 associated with first linerbolt removal tool 30 used for knocking out linerbolts 13,14, on cylindrical main body portion 16 and on frusto-conical end portions 12,17 of grinding mill 11. The first carriage assembly 18 is moveable along a fixed track 20 suspended above the grinding mill 11 and extending about an outer periphery thereof in a plane substantially parallel to a surrounding floor of the mill 11. The track 20 shown in FIG. 1A is of the monorail type comprising a single rail elevated above the mill 11 and suspended above the ground via a plurality of support pillars or poles. The track structure is typically a permanently fixed structure built around the mill 11.

The apparatus 1 further includes a second carriage assembly 19 associated with work platform 40 used for manual tasks on cylindrical main body portion 16 and on frusto-conical end portions 12,17 of the grinding mill 11.

The first carriage assembly 18 provides no more than five degrees of freedom to its associated linerbolt removal tool 30 while the second carriage assembly 19 provides no more than four degrees of freedom to its associated work platform 40.

The first carriage assembly 18 includes a first carriage 7 mounted for travel along the fixed track 20 disposed outside and surrounding the mill 11. In this regard, the first carriage 7 may be configured to slidably engage with the track 20 via rollers or the like, at least some of which are drivable to move the first carriage 7 along the track. A substantially straight first rail or post member 5, having a longitudinal axis orthogonal to the surrounding floor of the mill 11 is mounted to the first carriage 7. Typically, the rail 5 is slidably mounted to the first carriage 7 so as to be moveable up and down normal to the track 20. Whilst the entire rail 5 may be moveable, this need not be the case and in other examples, a lower portion of the rail may be telescopically moveable to extend and retract at least a portion of the rail 5.

A tool carriage 2 for carrying the linerbolt removal tool 30 is mounted beneath the first rail 5 at a distal end thereof. The tool carriage 2 has a linerbolt removal tool 30 slidably mounted thereon via a slide mechanism. The linerbolt removal tool 30 is mounted to the tool carriage 2 and oriented such that its tool centre can be located on a line Li radiating from the axis of rotation R of the mill 11 (see FIG. 1C), and its slide mechanism allows it move along that line.

Figure 3:
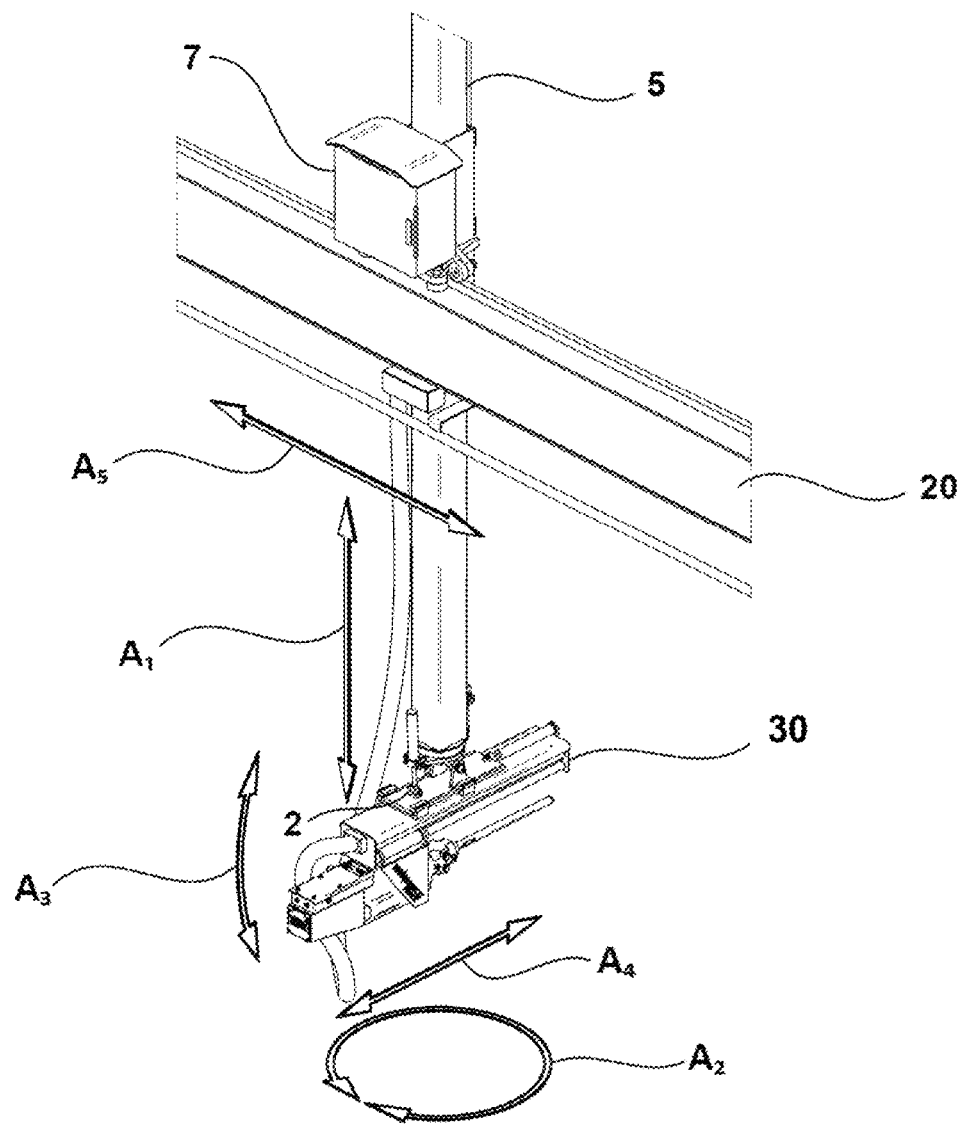
FIG. 3 is an enlarged perspective view of an example of a first carriage assembly mounted to a track for suspending and guiding a linerbolt removal tool.

In the example shown, the apparatus 1 provides the Linerbolt removal tool 30 with five degrees of freedom as illustrated most clearly in FIG. 3, where the various degrees of freedom are represented by arrows $A_1$-$A_5$. The travel of the first carriage 7 along the track 20 is depicted by arrow $A_5$ and the travel of first tool carriage 2 along an axis orthogonal to the surrounding floor of the mill 11 is shown by arrow $A_1$. The travel of linerbolt removal tool 30 along an axis orthogonal to both $A_1$ and $A_5$ is depicted by $A_4$. The travel along $A_4$ is achieved by the ability of the linerbolt removal tool 30 to slide with respect to the slide mechanism to which it is mounted.

As the mill 11 consists of a cylindrical main body 16 with frusto-conical ends 12,17, two additional axes of motion are required to enable the tool 30 to be positioned and oriented with respect to all linerbolts. The Linerbolt removal tool 30 is therefore able to rotate about a vertical axis via rotation of tool carriage 2 depicted by $A_2$. Finally, the tool carriage 2 is able to rotate about an axis orthogonal to both $A_1$ and $A_5$ depicted by arrow $A_3$. This is typically achieved by a pivotal connection between the coupling of the tool carriage 2 to the rail 5 and the slide mechanism to which the linerbolt removal tool 30 is attached. This rotational movement allows the linerbolt removal tool 30 to be angled up or down with respect to the mill 11.

The second carriage assembly 19 comprises a second carriage 6 mounted for travel on the fixed track 20 disposed outside and surrounding mill 11. A substantially straight second rail or post 4, having a longitudinal axis orthogonal to the floor of mill 11 is mounted to the secondary carriage 6. Work platform 40 is mounted beneath the second rail 4 at a distal end thereof.

Figure 4:
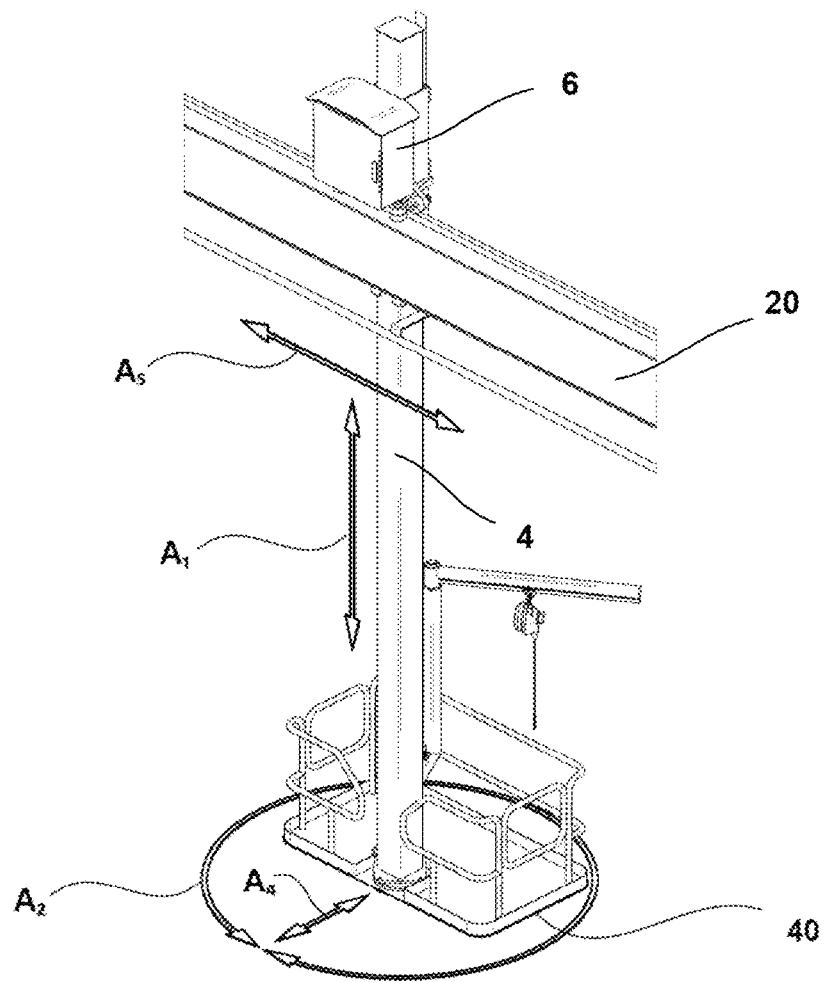
FIG. 4 is an enlarged perspective view of an example of a second carriage assembly mounted to a track for suspending and guiding a work platform; and, FIG. 5 is an enlarged perspective view of an example of a work platform and linerbolt removal tool mounted to the same carriage assembly.

In the example shown, the apparatus 1 provides the work platform 40 with four degrees of freedom as illustrated most clearly in FIG. 4, where the various degrees of freedom are represented by arrows $A_1$, $A_2$, $A_4$, $A_5$. The travel of the second carriage 6 is depicted by arrow $A_5$, the travel of first work platform 3 is shown by arrow $A_1$. As mill 11 consists of a cylindrical main body 16 with frusto-conical ends 12, 17, two additional axes of motion are required. $A_2$ rotates first work platform 3 about the axis $A_1$ and $A_4$ provides linear motion parallel to the surrounding floor of the mill 11.

Figure 5:
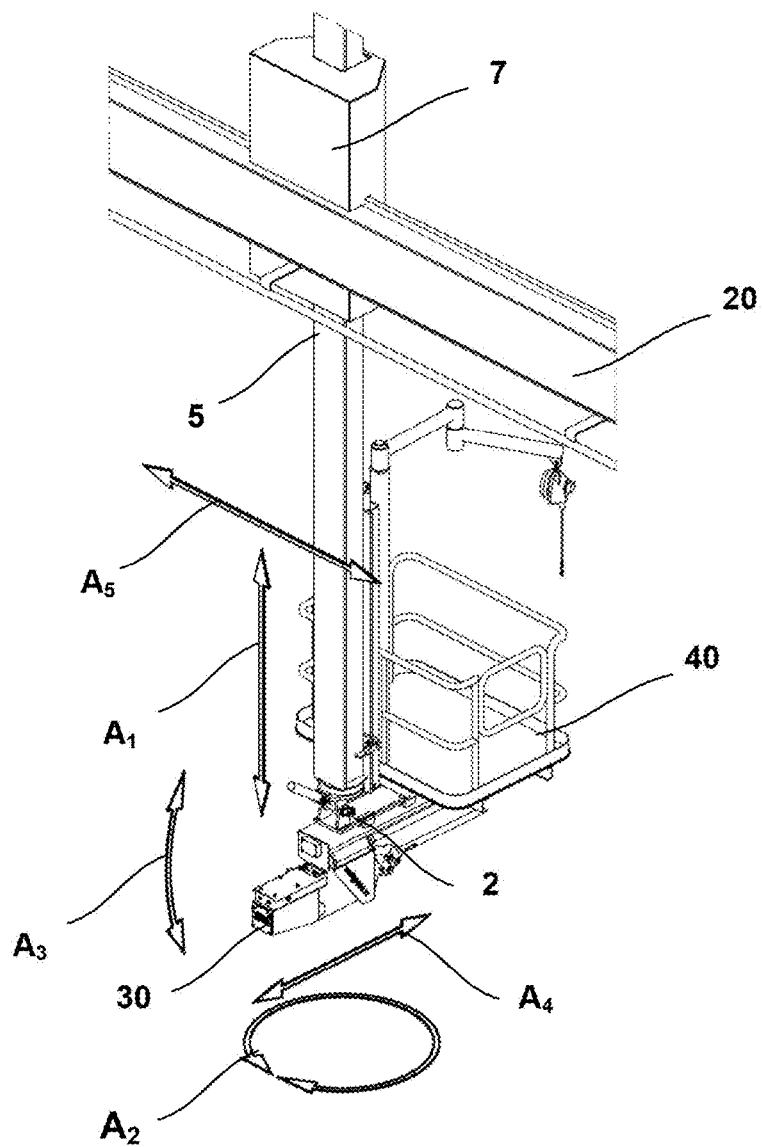

FIGS. 4 to 6 depict a second embodiment of an apparatus 1 for suspending and guiding multiple linerbolt removal tools 30,31,32,33 and work platforms 40,41 externally of a grinding mill 11.

Figure 2A:
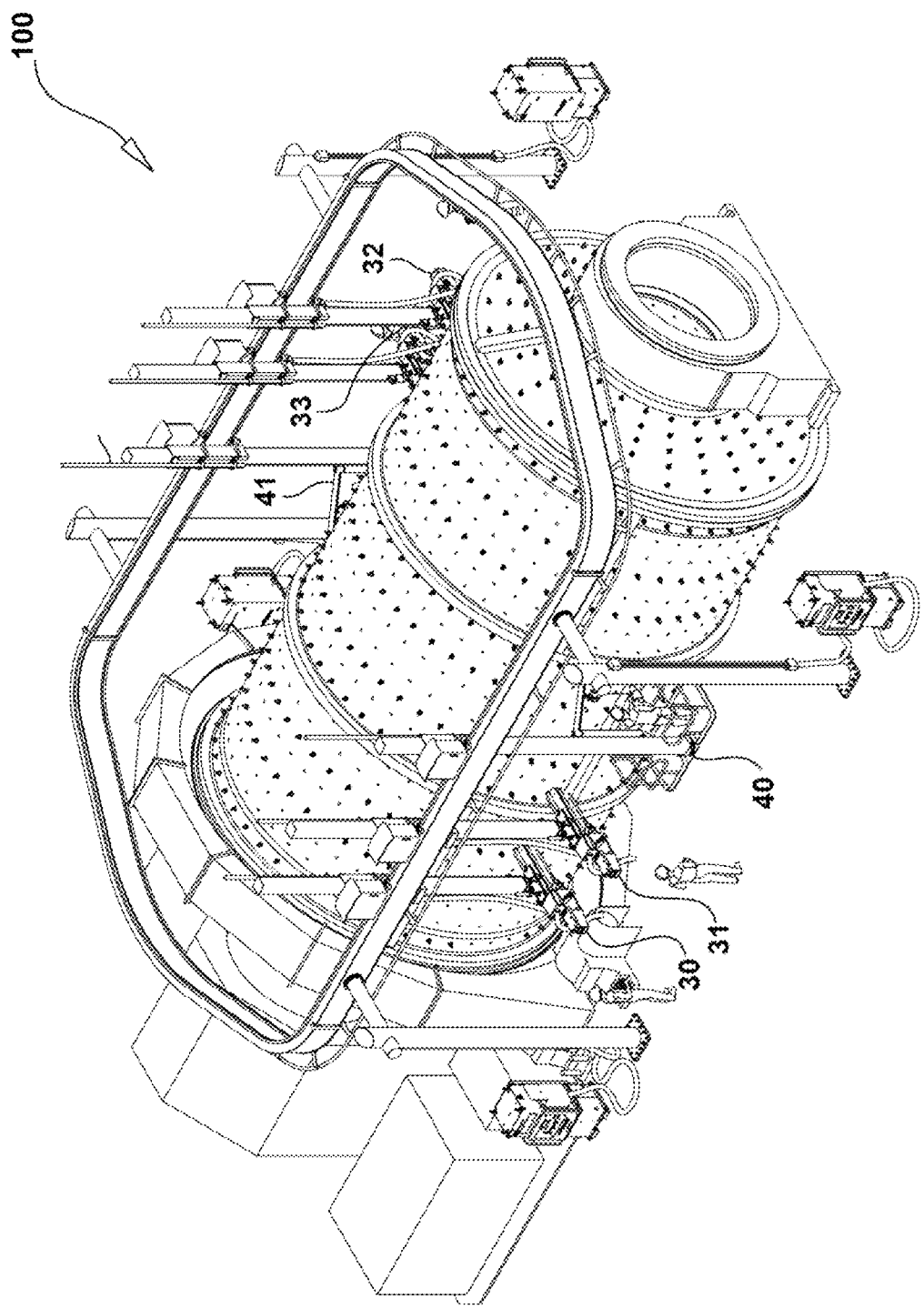
FIG. 2A is a perspective view of a further example of an apparatus for suspending and guiding at least one tool or work platform externally about a grinding mill.
Figure 2B:
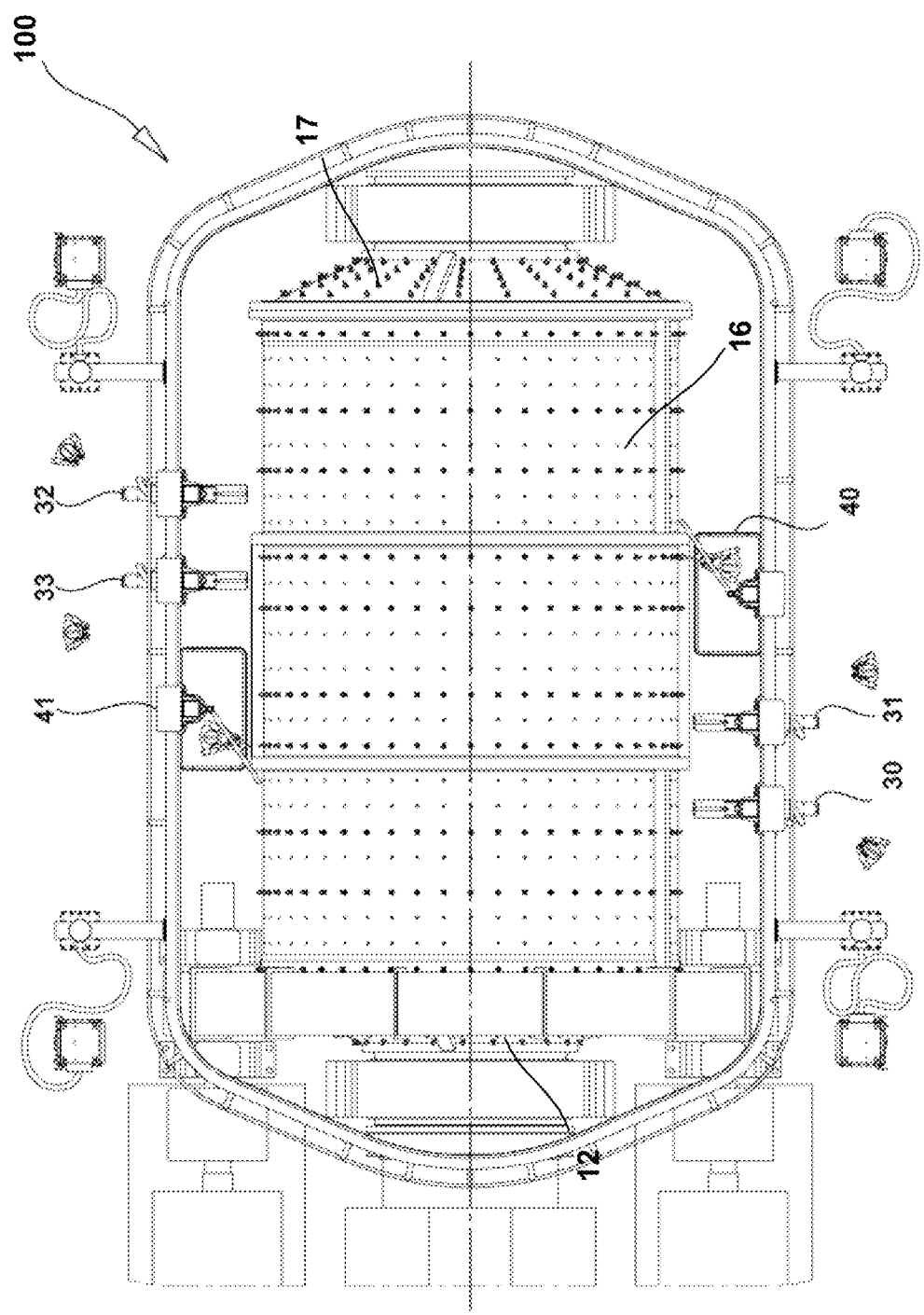
FIG. 2B is a plan view of the apparatus of FIG. 2A.
Figure 2C:
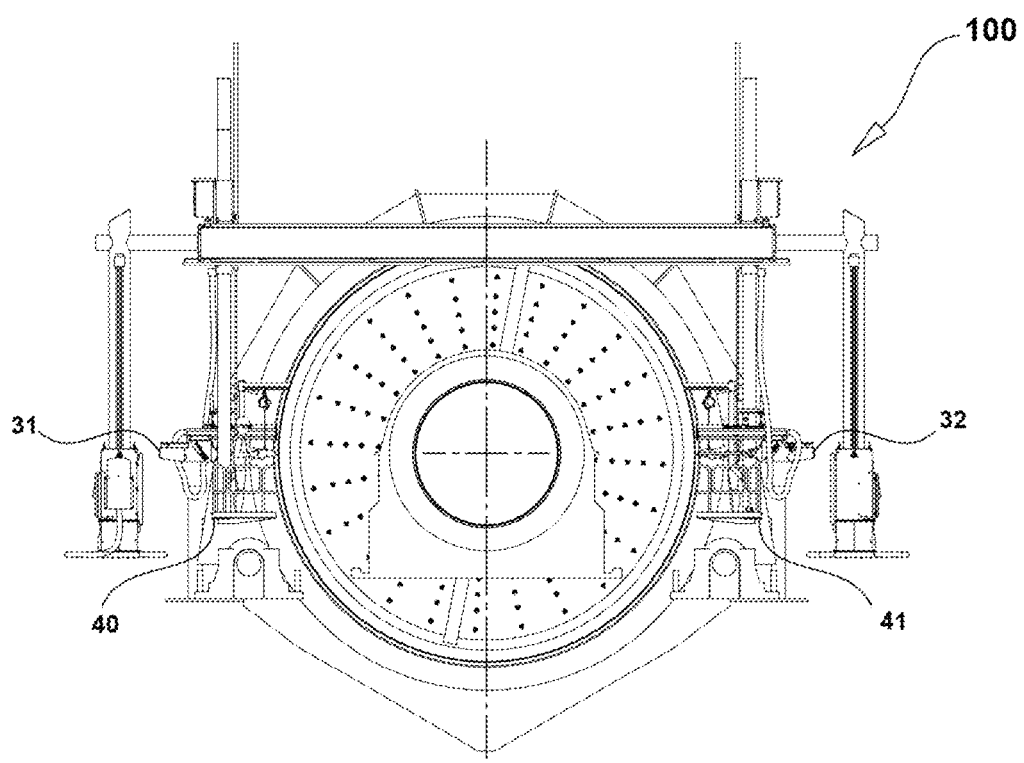
FIG. 2C is an end view of the apparatus of FIG. 2A.

Referring now to FIGS. 2A to 2C, there is shown a further example of an apparatus 100 for suspending and guiding a plurality of linerbolt removal tools 30,31,32,33 and work platforms 40,41 externally about a grinding mill 11. In this example, four Linerbolt removal tools 30,31,32,33 are positioned about the mill 11, with tools 30,31 positioned adjacent one another on a first side of the mill for operation at frusto-conical end 12 and one half of the cylindrical main body section 16. Linerbolt removal tools 32,33 are positioned adjacent each other on the other side of the mill 11 for operation at frusto-conical end 17 and the other half of the cylindrical main body section 16. As the mill is rotated during maintenance, such an arrangement is able to efficiently operate to remove all of the linerbolts as quickly as possible so as to minimise the time in which the mill out of operation during liner replacement.

Each linerbolt removal tool 30,31,32,33 operates in the same manner as previously described having up to five degrees of freedom for movement and positioning about the mill 5. Each linerbolt removal tool 30,31,32,33 is mounted to a separate carriage assembly that is moveable about the track as previously described.

In this example, two work platforms 40,41 are provided on opposing side of the mill 11 adjacent to linerbolt removal tools 30,31 and 32,33 respectively for use therewith. Work platforms 40,41 are provided with up to four degrees of freedom as previously described via mounting to respective carriage assemblies. In practice, any suitable number or combination of linerbolt removal tools and work platforms may be used during liner replacement.

Referring now to FIG. 5, there is shown an example of a linerbolt removal tool 30 and work platform 40 mounted to the same carriage assembly. This may be achieved in any suitable manner, and in one example, the work platform 40 may be mounted to the slide mechanism that the linerbolt removal tool is secured to. Alternatively, the platform may be mounted to the rail or post 5.

It should be understood that in other examples, any of the linerbolt removal tools of the above described examples could be replaced with other tools, and work platforms could also have fixed tools incorporated into their design. It should be also understood that the addition or replacement of tools or other paraphernalia will not inhibit or diminish the capability of the apparatus 1,100 to operate in a manual, semi-automated or fully automated capacity.

In this regard, it is to be understood that the apparatus 1,100 could be used for manual, semi-automated or fully automated removal of linerbolts and liners, and manual or semi-automated work platform positioning.

In one example, a linerbolt removal tool is able to be auto-positioned about the mill for removal of linerbolts. The position of each linerbolt relative to the mill may be determined by mapping so that the coordinates of each linerbolt are known with respect to a reference location. A tool controller or similar processing system may be provided with the coordinates of each linerbolt and programmed to move the tool in a systematic way to each bolt. For example, the tool may be positioned with respect to a first bolt so that the operator can manipulate the tool to remove the bolt. The operator may then provide input to the tool controller (for example via a lever or button) which is responsive to drive the tool to the position of a second bolt for removal. In this semi-autonomous way the tool can be moved about the mill for accurate positioning with respect to each bolt for the operator to remove. In an autonomous context, the tool may be programmed to be positioned relative to a bolt, accurately aligned with respect to the bolt and then actuated to remove the bolt.

According to at least one example, the above described apparatus provides a convenient, safe and efficient way to suspend and guide tools or platforms externally about a mill during liner replacement. The tools are suspended in a stable and secure manner which provides a safer environment for an operator when compared to systems in which tools are suspended by hanging cables and free to swing about. The ability to position and orient the tool with respect to the mill by providing up to five degrees of freedom is advantageous as a significant area of the mill (including both the main body portion and frusto-conical ends) can be accessed by a single tool, and linerbolts that are oblique or skewed can be also be handled efficiently. Furthermore, as the carriage assemblies are easily removed from the track, a high degree of modularity is provided. At a mine site with several mills potentially of different sizes, the carriage assemblies can be interchanged between different mills as required for servicing. This provides a substantial cost reduction as each mill does not require separate apparatus and tools for liner replacement.

The ability for each tool to access a large portion of the mill also means that liner replacement can be performed more efficiently requiring less mill rotations and time out of service. This further equates to a significant cost saving for the mill operator.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for facilitating maintenance of a grinding mill, the method comprising:
   a) positioning a linerbolt removal tool relative to an exterior of the grinding mill, wherein the linerbolt removal tool is suspended and guided by a first carriage assembly mounted to a fixed track suspended above the grinding mill and extending about an outer periphery thereof in a plane substantially parallel to a surrounding floor of the grinding mill, wherein the first carriage assembly is configured to provide the linerbolt removal tool with at least two degrees of freedom, and wherein positioning the linerbolt removal tool includes:
      i) moving the linerbolt tool in a first tool degree of freedom being linear movement along a first tool axis orthogonal to the surrounding floor of the mill; and
      ii) moving the linerbolt tool in a second tool degree of freedom being linear movement along the fixed track; and
   b) positioning a work platform relative to the exterior of the grinding mill and relative to the linerbolt removal tool, wherein the work platform is suspended and guided from the fixed track to provide the work platform with at least two degrees of freedom, and wherein positioning the work platform includes:
      i) moving the work platform in a first platform degree of freedom being linear movement along a first platform axis orthogonal to the surrounding floor of the mill; and
      ii) moving the work platform in a second platform degree of freedom being linear movement along the fixed track.

2. The method according to claim 1, wherein the first carriage assembly is configured to provide the linerbolt removal tool with five degrees of freedom, and wherein positioning the linerbolt removal tool further includes:

a) moving the linerbolt tool in a third tool degree of freedom being angular movement about the first tool axis;
b) moving the linerbolt tool in a fourth tool degree of freedom being angular movement about a second tool axis orthogonal to the first tool axis; and,
c) moving the linerbolt tool in a fifth tool degree of freedom being linear movement along a third tool axis orthogonal to the second tool axis.

3. The method according to claim 1, wherein four degrees of freedom are provided to the work platform, and wherein positioning the work platform further includes:
a) moving the work platform in a third platform degree of freedom being angular movement about the first platform axis; and,
b) moving the work platform in a fourth platform degree of freedom being linear movement along a second platform axis orthogonal to the first platform axis and parallel to the surrounding floor of the mill.

4. The method according to claim 1, wherein the first carriage assembly includes:
a) a first carriage moveably mounted to the fixed track for linear movement therealong;
b) a first post member supported by the first carriage and arranged to be orthogonal to the surrounding floor of the mill, at least a part of the first post member moveable along the first tool axis; and,
c) a first tool carriage for carrying the linerbolt removal tool, the first tool carriage mounted to the first post member such that the first tool carriage is provided with angular movement about the first tool axis and angular movement about a second tool axis orthogonal to the first tool axis, the first tool carriage further including a linear slide mechanism to which the linerbolt removal tool is attached for allowing the linerbolt removal tool to move along a third tool axis orthogonal to the second tool axis.

5. The method according to claim 4, wherein the method further comprises:
a) orienting the linerbolt removal tool toward the grinding mill by moving the first tool carriage about the first and second tool axes; and
b) moving the linerbolt removal tool toward or away from the grinding mill using the linear slide mechanism.

6. The method according to claim 4, wherein the linerbolt removal tool is attached to the linear slide mechanism such that a tool centre of the linerbolt removal tool is aligned with the third tool axis.

7. The method according to claim 4, wherein the linerbolt removal tool is slidably mounted to the first tool carriage via the linear slide mechanism and wherein the method further comprises orienting the linerbolt removal tool such that a tool centre of the linerbolt removal tool is located on a line radiating from an axis of rotation of the grinding mill, the slide mechanism allowing the linerbolt removal tool to move along the line.

8. The method according to claim 1, wherein the work platform is suspended and guided by a second carriage assembly that includes:
a) a second carriage moveably mounted to the fixed track for linear movement therealong; and
b) a second post member supported by the second carriage and arranged to be orthogonal to the surrounding floor of the mill, at least a part of the second post member moveable along the first platform axis, wherein the work platform is mounted to a distal end of the second post member to allow angular movement about the first platform axis and linear movement along a second platform axis orthogonal to the second post member.

9. The method according to claim 8, wherein the method further comprises:
a) orienting the work platform relative to the grinding mill by moving the work platform about the first platform axis; and
b) moving the work platform tool toward or away from the grinding mill by moving the work platform along the second platform axis.

10. The method according to claim 8, wherein the first carriage assembly is moveably mounted to a first fixed track and the second carriage assembly is moveably mounted to a second fixed track, the second fixed track parallel to the first fixed track.

11. The method according to claim 10, wherein the first carriage assembly is removeably mounted to the first fixed track and the second carriage assembly is removeably mounted to a second fixed track to thereby allow the first and second carriage assemblies to be interchanged between different grinding mills.

12. The method according to claim 1, wherein the work platform is suspended and guided by the first carriage assembly.

13. The method according to claim 1, wherein the first carriage assembly is removably mounted to the fixed track to thereby allow the first carriage assembly to be interchanged between different grinding mills.

14. The method according to claim 1, wherein the method further comprises automatically positioning the linerbolt removal tool about the grinding mill for removal of linerbolts.

15. The method according to claim 1, wherein the method further comprises:
a) determining a position of a first linerbolt for removal; and
b) causing a tool controller to move the linerbolt removal tool to the position of the first linerbolt.

16. The method according to claim 15, wherein the method further comprises positioning the work platform proximate to the linerbolt removal tool to thereby allow an operator to stand on the work platform and manipulate the linerbolt removal tool to remove the first linerbolt.

17. The method according to claim 15, wherein the method further comprises the operator manually aligning a tool centre of the linerbolt removal tool with a bolt axis of the first linerbolt.

18. The method according to claim 15, wherein the method further comprises the operator providing an input to the linerbolt removal tool to activate the linerbolt removal tool for removal of the first linerbolt.

19. The method according to claim 15, wherein the method further comprises the operator providing an input to the tool controller to cause the tool controller to move the linerbolt removal tool to a position of a second linerbolt for removal.

20. The method according to claim 1, wherein the method further comprises positioning a plurality of linerbolt removal tools relative to the grinding mill, each of the plurality of linerbolt removal tools being suspended and guided by a respective carriage assembly mounted to the fixed track.

* * * * *